United States Patent
Ahire et al.

(10) Patent No.: US 12,257,713 B2
(45) Date of Patent: *Mar. 25, 2025

(54) METHODS FOR GENERATING A DIGITAL TWIN OF A WORKPIECE IN FINISHING PROCESSES

(71) Applicant: GrayMatter Robotics Inc., Gardena, CA (US)

(72) Inventors: Avadhoot Ahire, Gardena, CA (US); Cheng Gong, Gardena, CA (US); Rishav Guha, Gardena, CA (US); Satyandra K. Gupta, Gardena, CA (US); Ariyan M. Kabir, Gardena, CA (US); Michael Marsh, Jr., Gardena, CA (US); Brual C. Shah, Gardena, CA (US)

(73) Assignee: GrayMatter Robotics Inc., Gardena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,121

(22) Filed: Oct. 11, 2023

(65) Prior Publication Data

US 2024/0033913 A1 Feb. 1, 2024

Related U.S. Application Data

(63) Continuation of application No. 18/136,244, filed on Apr. 18, 2023, now Pat. No. 11,820,018, which is a
(Continued)

(51) Int. Cl.
*B25J 9/16* (2006.01)
*B24B 51/00* (2006.01)
(Continued)

(52) U.S. Cl.
CPC ............ *B25J 9/1653* (2013.01); *B24B 51/00* (2013.01); *B25J 9/163* (2013.01); *B25J 9/1664* (2013.01);
(Continued)

(58) Field of Classification Search
CPC ........ B25J 9/1653; B25J 9/163; B25J 9/1664; B25J 9/1679; B25J 9/1697; B25J 11/0065;
(Continued)

(56) References Cited

U.S. PATENT DOCUMENTS 11,820,018 B1* 11/2023 Ahire ................. B25J 9/1679
2018/0283019 A1* 10/2018 Telleria ................ E04F 21/16
(Continued)

*Primary Examiner* — Robert T Nguyen
(74) *Attorney, Agent, or Firm* — Run8 Patent Group, LLC; Peter Miller

(57) ABSTRACT

A method includes: compiling images, captured by an end effector traversing a scan path over a workpiece, into a virtual model of the workpiece; generating a toolpath based on a geometry of the workpiece represented in the virtual model; and assigning a target force to the workpiece. The method also includes, during a processing cycle: navigating a sanding head, arranged on the end effector, across the workpiece according to the toolpath; based on force values output by a force sensor coupled to the sanding head, deviating the sanding head from the toolpath to maintain forces of the sanding head on the workpiece proximal the target force; and tracking a sequence of positions of a reference point on the sanding head, traversing the workpiece, in contact with the workpiece. The method also includes transforming the virtual model into alignment with the sequence of positions of the reference point.

19 Claims, 5 Drawing Sheets

Related U.S. Application Data continuation-in-part of application No. 18/111,470, filed on Feb. 17, 2023, now Pat. No. 12,049,009, which is a continuation of application No. 17/829,193, filed on May 31, 2022, now Pat. No. 11,613,014, which is a continuation of application No. 17/826,840, filed on May 27, 2022, which is a continuation-in-part of application No. 17/390,885, filed on Jul. 31, 2021, now abandoned.

(60) Provisional application No. 63/059,932, filed on Jul. 31, 2020.

(51) Int. Cl.
| | | |
|---|---|---|
| *B25J 11/00* | (2006.01) | |
| *B25J 13/08* | (2006.01) | |
| *G06T 1/00* | (2006.01) | |
| *G06T 7/13* | (2017.01) | |
| *G06T 7/60* | (2017.01) | |
| *G06T 19/00* | (2011.01) | |

(52) U.S. Cl.
CPC ............ *B25J 9/1679* (2013.01); *B25J 9/1697* (2013.01); *B25J 11/0065* (2013.01); *B25J 13/085* (2013.01); *G06T 1/0014* (2013.01); *G06T 7/13* (2017.01); *G06T 7/60* (2013.01); *G06T 19/00* (2013.01); *G06T 2207/10024* (2013.01); *G06T 2219/004* (2013.01)

(58) Field of Classification Search
CPC ....... B25J 13/085; B25J 9/1633; B24B 51/00; B24B 49/12; G06T 1/0014; G06T 7/13; G06T 7/60; G06T 19/00; G06T 2207/10024; G06T 2219/004; G06T 17/20; G05B 2219/36251; G05B 2219/40586

See application file for complete search history.

(56) References Cited

U.S. PATENT DOCUMENTS

| | | | |
|---|---|---|---|
| 2020/0171620 | A1* | 6/2020 | Aubin .................... B24B 49/12 |
| 2021/0260720 | A1* | 8/2021 | Chankaramangalam .................... B24B 49/12 |
| 2024/0300539 | A1* | 9/2024 | Donderici .............. G01S 13/86 |

* cited by examiner

METHODS FOR GENERATING A DIGITAL TWIN OF A WORKPIECE IN FINISHING PROCESSES

CROSS-REFERENCE TO RELATED APPLICATIONS

This application is a continuation application of U.S. patent application Ser. No. 18/136,244, filed on 18 Apr. 2023, which is a continuation-in-part of U.S. application Ser. No. 18/111,470, filed on 17 Feb. 2023, which is a continuation of U.S. application Ser. No. 17/829,193, filed on 31 May 2022, which is a continuation of U.S. application Ser. No. 17/826,840, filed on 27 May 2022, which is a continuation-in-part of U.S. application Ser. No. 17/390,885, filed on 31 Jul. 2021, which claims the benefit of U.S. Provisional Application No. 63/059,932, filed on 31 Jul. 2020, each of which is incorporated in its entirety by this reference.

TECHNICAL FIELD

This invention relates generally to the field of automated finishing and more specifically to a new and useful system and method for autonomously scanning, processing, and modeling a digital twin of a workpiece in the field of automated finishing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
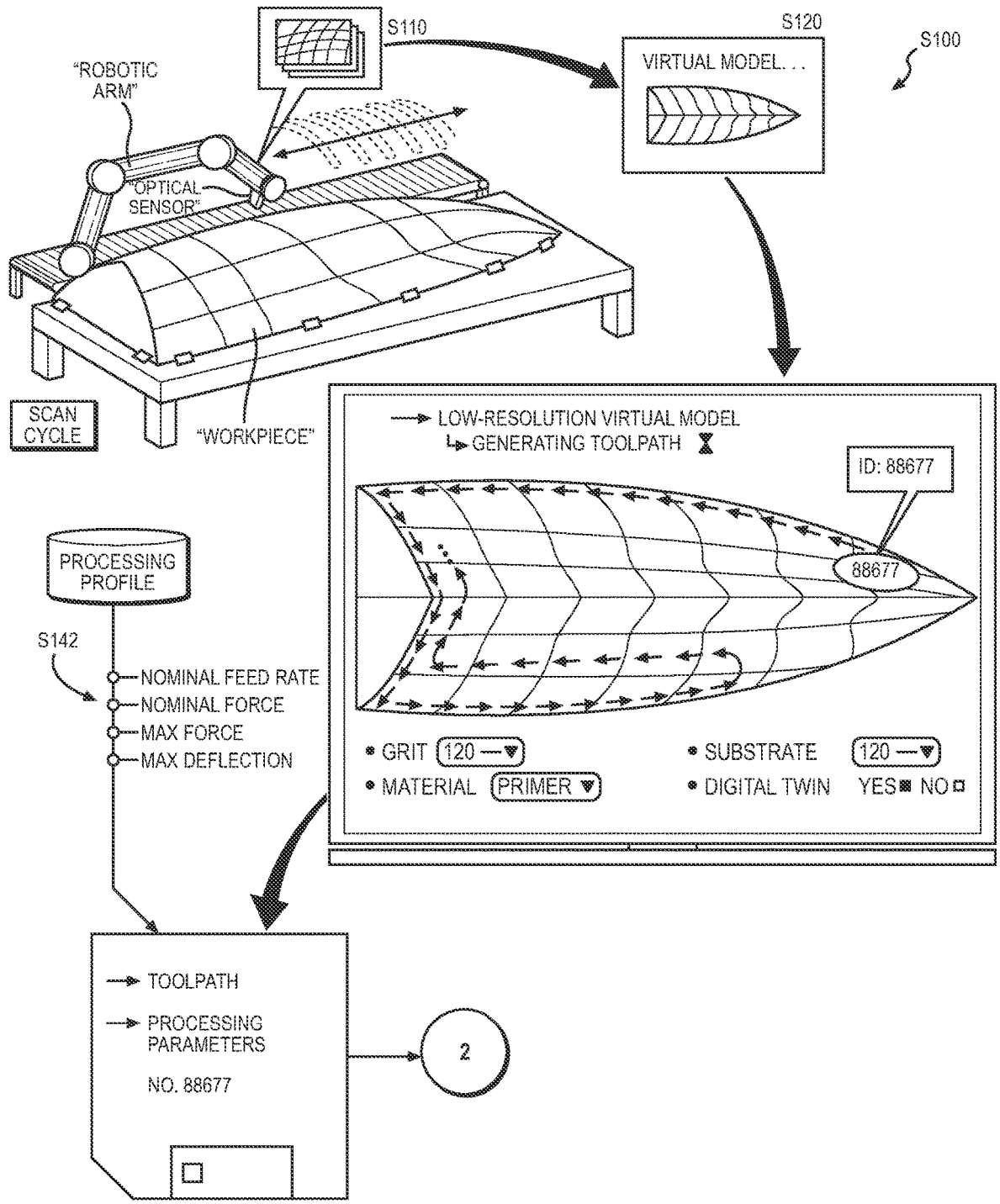
FIG. 1 is a flowchart representation of a method.
Figure 2:
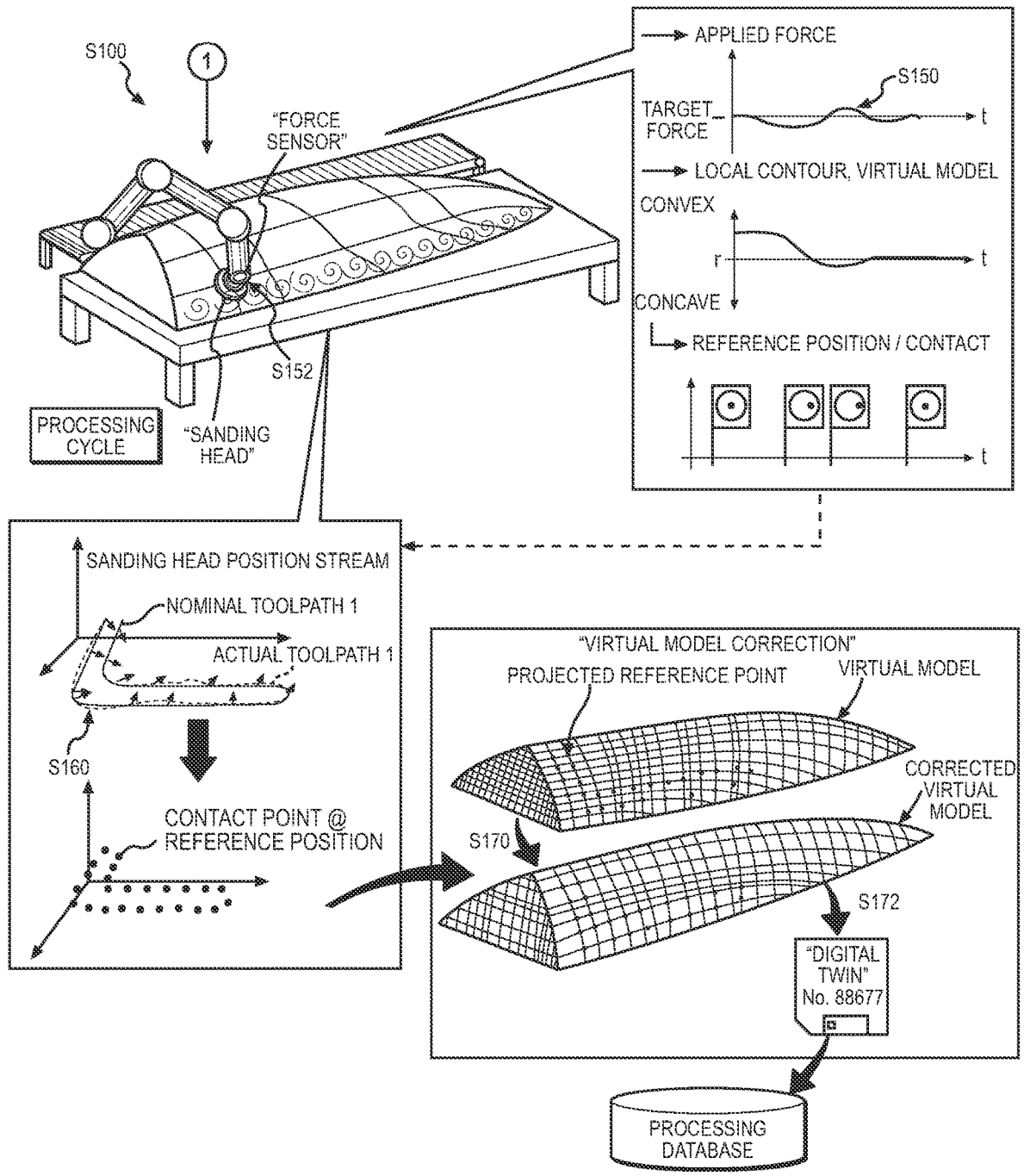
FIG. 2 is a flowchart representation of one variation of the method.

As shown in FIGS. 1 and 2, a method S100 for autonomously processing a workpiece includes: accessing a set of images captured by an optical sensor arranged on an end effector traversing a scan path over a workpiece during a scan cycle in Block S110; compiling the set of images into a virtual model of the workpiece in Block S120; generating a toolpath for the workpiece based on a geometry of the workpiece represented in the virtual model in Block S140; and assigning a target force to the workpiece in Block S142. The method S100 also includes, during a processing cycle: accessing a sequence of force values output by a force sensor coupled to a sanding head arranged on the end effector in Block S150; via a set of actuators coupled to the end effector, navigating the sanding head across the workpiece according to the toolpath in Block S152 and, based on the sequence of force values, deviating the sanding head from the toolpath to maintain forces of the sanding head on the workpiece proximal the target force in Block S154; and tracking a sequence of positions of a reference point on the sanding head, traversing the workpiece, in contact with the workpiece in Block S160. The method S100 further includes: transforming (or "deforming") the virtual model into alignment with the sequence of positions of the reference point in Block S170; and storing the virtual model, transformed (or "deformed") according to the sequence of positions, as a digital three-dimensional record of the workpiece in Block S172.

One variation of the method S100 includes: accessing a set of images captured by an optical sensor arranged on an end effector traversing a scan path over a workpiece during a scan cycle in Block S110; compiling the set of images into a virtual model of the workpiece in Block S120; generating a first toolpath for a first workpiece region of the workpiece based on a geometry of the workpiece represented in the virtual model Block S140; and assigning a first target force to the first workpiece region in Block S142. This variation of the method S100 also includes, during a processing cycle: accessing a first sequence of force values output by a force sensor coupled to a sanding head arranged on the end effector in Block S150; via a set of actuators coupled to the end effector, navigating the sanding head across the first workpiece region according to the first toolpath in Block S152 and, based on the first sequence of force values, deviating the sanding head from the first toolpath to maintain forces of the sanding head on the first workpiece region proximal the first target force in Block S154; and tracking a first sequence of positions of a reference point on the sanding head traversing the first workpiece region in Block S160. This variation of the method S100 further includes: transforming the virtual model into alignment with the first sequence of positions of the reference point in Block S170; and storing the virtual model, transformed according to the first sequence of positions, as a digital three-dimensional record of the workpiece in Block S172.

Another variation of the method S100 includes: accessing a set of images captured by an optical sensor arranged on an end effector traversing a scan path over a workpiece during a scan cycle in Block S110; compiling the set of images into a virtual model of the workpiece in Block S120; generating a first toolpath for a first workpiece region of the workpiece based on the virtual model in Block S140, the first toolpath including a first keypoint located on the virtual model and a second keypoint located on the virtual model; and assigning a first target force to the first workpiece region in Block S142. This variation of the method S100 also includes, during a processing cycle: accessing a first sequence of force values output by a force sensor coupled to a sanding head arranged on the end effector in Block S150; via a set of actuators coupled to the end effector, navigating the sanding head across the first workpiece region according to the first toolpath in Block S152 and, based on the first sequence of force values, deviating the sanding head from the first toolpath to maintain forces of the sanding head on the first workpiece region proximal the first target force in Block S154; interpreting a first position of a reference point, on the sanding head, in contact with the workpiece when the sanding head occupies the first keypoint in Block S160; and interpreting a second position of the reference point in contact with the workpiece when the sanding head occupies the second keypoint in Block S160. This variation of the method S100 further includes: transforming the virtual model in Block S170 to align a) the first keypoint on the virtual model to the first position of the reference point b) the second keypoint on the virtual model to the second position of the reference point; and storing the virtual model, transformed according to the first position and the second position, as a digital three-dimensional record of the workpiece in Block S172.

2. Applications

Generally, an autonomous scanning and sanding system (hereinafter the "system") can execute Blocks of the method S100: to autonomously capture scan data of a workpiece occupying a work cell during a rapid, contactless scan cycle; to compile these scan data into a virtual three-dimensional model exhibiting relatively low spatial or dimensional accuracy; to generate a toolpath spanning surfaces represented in the virtual model and defining a sequence of nominal positions and orientations traversable by a sanding head to sand (hereinafter "process") the workpiece; and to assign a target force for application of the sanding head on the workpiece.

The system can further execute Blocks of the method S100: to track forces applied by the sanding head to the workpiece; to advance and retract the sanding head normal to the workpiece while navigating the sanding head along the toolpath to maintain forces applied by the sanding head to the workpiece at the target force; and to capture a series of coordinate measurements (e.g., three-dimensional positions) of a reference point (or a set of reference points, a surface, an area) on the sanding head in contact with the workpiece. These coordinate measurements may thus represent true three-dimensional positions of points on real surfaces of the workpiece with high dimensional accuracy. Accordingly, the system then: transforms (or "deforms") the virtual model of the workpiece into alignment with this sequence of coordinate measurements, thereby reducing errors in and increasing dimensional accuracy of the virtual model; and store this modified virtual model as a digital three-dimensional record (or "digital twin") of the workpiece.

2.1 Sparse Data Fusion into High-Accuracy Digital Twin.

Generally, the system can navigate an optical sensor—mounted on the end effector—rapidly over the workpiece to capture sparse scan data (e.g., color images, depth maps) characterized by relatively low resolution and/or low dimensional accuracy during a scan cycle. The system then transforms these coarse optical data into a virtual three-dimensional model representing the workpiece with relatively low resolution and/or low dimensional accuracy.

In particular, the system: limits time spent scanning the workpiece by capturing low-resolution and/or low-accuracy optical data; and limits time and computational load allocated to generating the virtual model by both manipulating low-resolution and/or low-accuracy data and generating a virtual model with relatively low dimensional accuracy requirements. The system can therefore quickly transition from scanning the workpiece and generating a toolpath for the workpiece to processing the workpiece (i.e., traversing a sanding head across the workpiece to remove material from the workpiece).

Accordingly, the virtual model exhibits relatively low dimensional accuracy and may exhibit defects that deviate (significantly) from the real surface of the workpiece. For example, the virtual model may thus exhibit holes, an incorrect surface profile, and dimensional deviation from the real workpiece. Therefore, the system implements Blocks of the method S100 to increase dimensional accuracy of the virtual model and corrects these defects based on processing data—representing physical contact between the sanding head and the workpiece while autonomously sanding the workpiece—during a subsequent processing cycle.

More specifically, the system can: rapidly scan the workpiece during the scan cycle to capture coarse optical scan data; transform these coarse scan data into a low-resolution virtual model exhibiting low dimensional accuracy in a virtual three-dimensional space; and generate toolpaths for the workpiece based on a surface geometry represented in the low-resolution virtual model. The system can then: autonomously navigate the sanding head across the workpiece according to these toolpaths; implement closed-loop controls to maintain force applied by the sanding head to the workpiece at a target force by deviating the sanding head from the toolpath normal to the adjacent surface represented in the low-resolution virtual model; and track three-dimensional positions of contact between the sanding head and the workpiece while traversing the sanding head across the workpiece. The system can then: project these three-dimensional positions of contact into the virtual three-dimensional space; and transform the virtual model into alignment with these three-dimensional positions of contact, thereby correcting the virtual model to reflect coordinate measurements captured by the system in real-time while processing the workpiece.

More specifically, the system can correct the virtual model based on real contact between the sanding head and the workpiece collected while autonomously processing (e.g., sanding) the workpiece during the processing cycle.

For example, the system can compile scan data collected during the scan cycle into a three-dimensional mesh. For each contact point—in a sequence of contact points between the sanding head and the workpiece—captured by the system during the subsequent processing cycle, the system can: select a target vertex in the mesh nearest the contact point; shift the target vertex—normal to the mesh at the vertex—to a new position nearest the contact point; and shift nearby vertices in the mesh to minimize changes in tangents on the surface and/or local radii at the target vertex. In a similar example, for each contact point in the sequence of contact points between the sanding head and the workpiece thus captured by the system, the system can: isolate a location on the toolpath—defined along the surface of the virtual model—corresponding to this contact point; insert a new vertex intersecting a surface defined by the mesh at this toolpath location; shift the new vertex to align with the contact point; and shift nearby vertices in the mesh to minimize changes in tangents on the surface and/or local radii at the new vertex.

Therefore, the system can: generate a virtual model characterized by lower dimensional accuracy (e.g., characterized by a tolerance of +/−0.35") but representing the entire workpiece based on non-contact optical data captured by the system during a scan cycle; generate a nominal toolpath for the workpiece based on the virtual model; navigate the sanding head across the workpiece according to a real toolpath that approximates the nominal toolpath but that maintains a target force between the sanding head and the workpiece, thus maintaining consistent material removal and surface finish across the workpiece; and capture sparse three-dimensional positions of a reference point on the sanding head in contact with the workpiece while autonomously sanding the workpiece. The system can then fuse the virtual model and the sparse three-dimensional positions of the reference point to generate a digital three-dimensional record that represents the workpiece with greater dimensional accuracy (e.g., within a tolerance of +/−0.025").

2.2 Coordinate Measurement Correction for Workpiece Compliance

In one variation, the system further accesses or derives compliance data for the workpiece and corrects three-dimensional positions of the reference point on the sanding head—tracked during a processing cycle—based on local compliance of the workpiece.

Generally, autonomous application of the sanding head onto a workpiece while maintaining a high target force between the sanding head and the workpiece yield a high rate of material removal but may also damage regions of the workpiece exhibiting high compliance, such as regions characterized by thin walls or lacking interior support structures. Conversely, autonomous application of the sanding head onto the workpiece while maintaining a low target force between the sanding head and the workpiece may avoid damage to high-compliance regions of the workpiece but yield slow material removal rates and therefore extend a processing duration for the workpiece.

Furthermore, the workpiece may be arranged over and retained on a table, fixture, or other support rig with a target surface of the workpiece facing upwardly and/or outwardly. The support rig may partially or fully obscure the rear structure of the workpiece—behind the target surfaces—from the optical sensors on the system. The interior structure of the workpiece may include thin-walled (or "shell") panel areas, unidirectional ribbing, multidirectional ribbing, gussets, non-uniform wall thicknesses, etc. that may yield varying compliance characteristics across these target surfaces of the workpiece. More specifically, different interior structures behind target surfaces on the workpiece may yield different compliance characteristics, stiffnesses, and effective spring rates within and between these target surfaces on the workpiece. Some or all of these interior structures may not be visible to optical sensors in the system when scanning or processing the workpiece.

For example, ribs, gussets, and other interior support structures may be integrated into the workpiece behind a target surface of the workpiece that otherwise exhibits high compliance. These interior support structures may thereby yield heterogenous, discontinuous compliance across this target surface on the workpiece.

Therefore, compliance characteristics, stiffnesses, and effective spring rates, etc. of target surfaces on the workpiece may not be predictable from scan data alone. Autonomously traversing the sanding head across these target surfaces of the workpiece with a high constant (and high) target force may damage regions of the workpiece that exhibit high compliance and insufficient stiffness to resist plastic deformation against this high target force. Conversely, traversing the sanding head across these target surfaces of the workpiece with a low constant target force may avoid damage to regions of the workpiece exhibiting high compliance and low stiffness but also yield a reduced material removal rate and therefore increased processing time for the workpiece. Furthermore, traversing the sanding head across these target surfaces of the workpiece with a constant target force may induce vibrations in the workpiece as the sanding head moves between regions of the workpiece exhibiting different compliance characteristics, thereby yielding inconsistent contact between the sanding head and the workpiece, inconsistent material removal from the workpiece, and low-quality surface finish across the workpiece.

Therefore, the system can execute Blocks of the method S100 to: predict magnitude of compliance of the workpiece during application of the sanding head at a particular location on the workpiece and at a specified target force; and adjust (or "correct") a three-dimensional position of the reference point on the sanding head according to this magnitude of compliance. Additionally or alternatively, the system can: set a target force applied by the sanding head to regions of the workpiece based on (e.g., proportional to) compliance of the workpiece in these regions; and adjust three-dimensional positions of the reference point on the sanding head according to corresponding force magnitudes applied by the sanding head, such as to correct for compression of a compliant backing supporting a sanding pad on the sanding head.

3. System

In one implementation described in U.S. patent application Ser. No. 18/111,470 and shown in FIG. 1, the system includes: a robotic arm arranged in or adjacent a work zone and that includes a set of articulatable joints interposed between a series of arm segments; an end effector supported on a distal end of the robotic arm; a sanding head arranged on or integrated into the end effector and configured to actuate (e.g., rotate) a sanding pad; an optical sensor (e.g., a set of depth sensors and/or color cameras) arranged on or integrated into the end effector and configured to capture optical images (e.g., depth maps, photographic color images) of a workpiece; a force sensor (e.g., a one-dimensional axial force sensor) configured to output a signal representing a force applied by the sanding head to a workpiece normal to the sanding head; a set of position sensors configured to output signals representing (or assemblable into) a three-dimensional position of the end effector; a display configured to render a user interface accessible by an operator; and/or a controller configured to execute Blocks of the method S100.

In this implementation, the system can also include a conveyor configured to traverse the robotic arm longitudinally along the work zone, such as to reach and process an elongated part defining a high length-to-width ratio (e.g., a high aspect ratio), such as a boat hull or aircraft wing.

In another implementation, the system includes a multi-axis (e.g., five-axis) gantry configured to locate and articulate the end effector, sanding head, and optical sensor(s) across the work zone.

However, the system can include or define any other element or structure.

4. Workpiece Loading and Processing Limits

In one variation, the system retrieves processing limits and/or other parameters for autonomously sanding the workpiece.

In particular, in preparation for autonomously processing (e.g., sanding) a workpiece by the system, an operator locates the workpiece in the work zone adjacent the system. For example, the operator may: load the workpiece onto a support rig (e.g., a wheeled table) and install intermittent clamps on the workpiece to retain the workpiece on the support rig; place the support rig and workpiece into the work zone; and lock wheels of the support rig.

The system can then prompt the operator to supply processing limits for the workpiece, such as including: a maximum applied force (i.e., a maximum force applied by the sanding head to any region of the workpiece); a maximum applied pressure (e.g., a maximum force applied by the sanding head to any unit area of the workpiece); and a maximum deformation of the workpiece (e.g., a maximum distance of a point on the workpiece in an unloaded position to a loaded position when the system applies the sanding head to the workpiece). For example, the operator can supply these processing limits based on known strengths and compliance characteristics of the workpiece.

Additionally or alternatively, the system can retrieve these processing limits from a predefined processing profile. For example, the system can select a predefined processing profile stored in a processing profile database based on: a material of the workpiece (e.g., fiberglass, steel, aluminum) and/or a nominal wall thickness of the workpiece selected by the operator; or a length, aspect ratio, and/or a geometry profile of the workpiece (e.g., concave with high aspect ratio, convex with high aspect ratio, concave with low aspect ratio, convex with low aspect ratio) entered by the operator or derived from a scan of the workpiece completed by the system. The system can then load processing limits extracted from this processing profile.

However, the system can retrieve or load processing limits for the workpiece based on any other data supplied by the operator or collected autonomously by the system during a scan cycle as described below.

5. Part Scan

Figure 3:
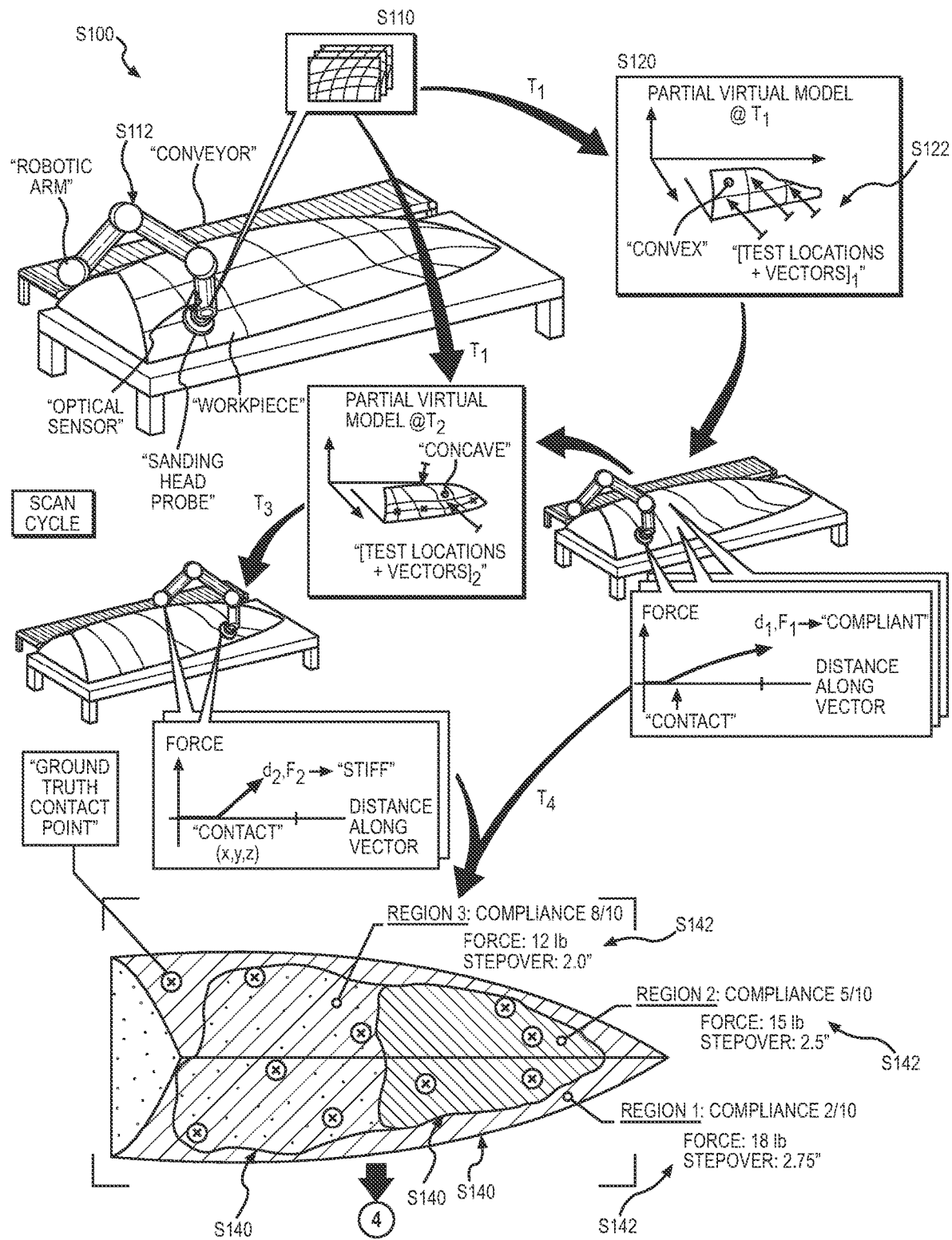
FIG. 3 is a flowchart representation of one variation of the method.
Figure 5:
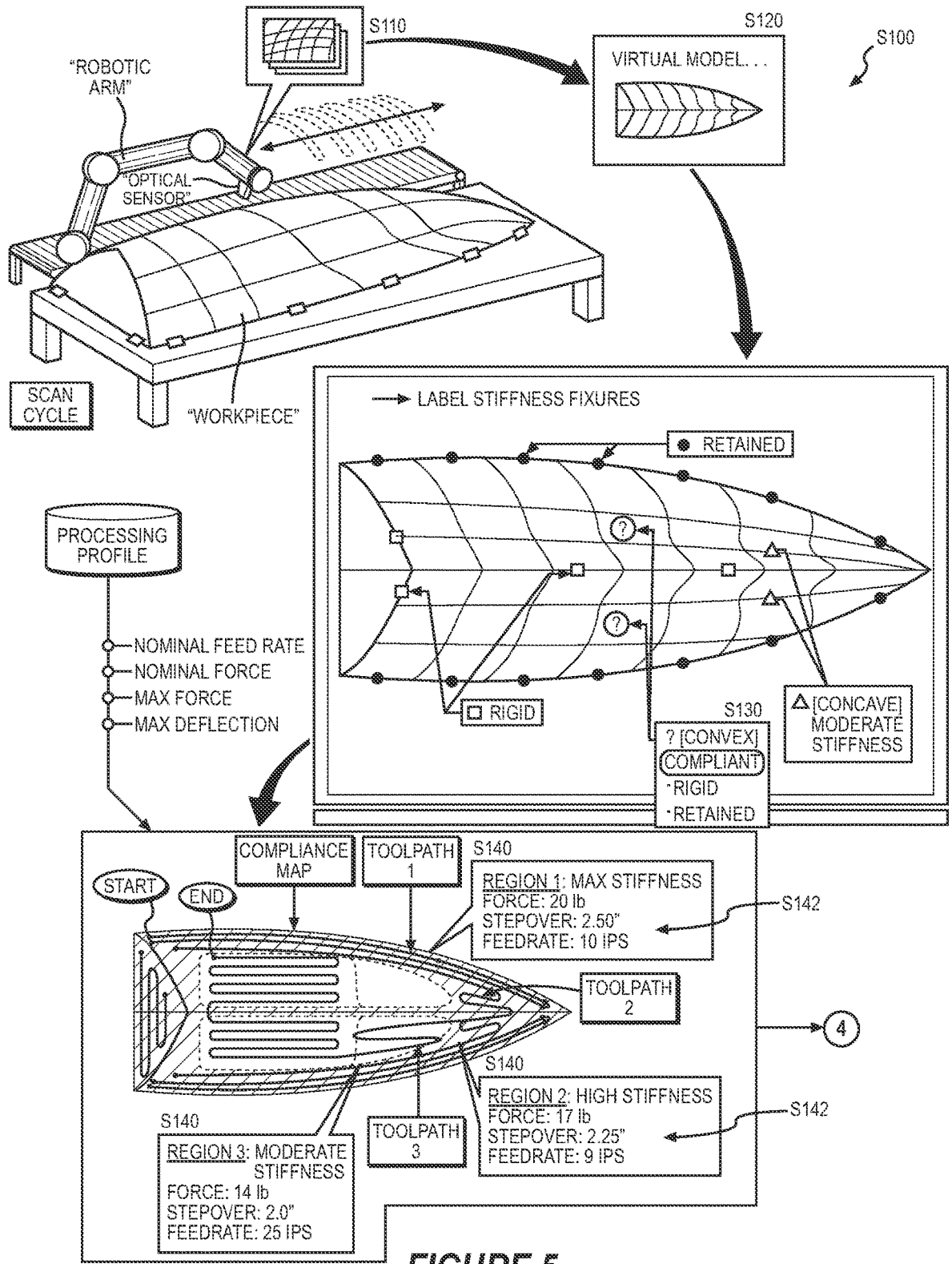
FIG. 5 is a flowchart representation of one variation of the method.

Blocks S112, S110, and S120 of the method S100 recite: navigating an end effector over a workpiece; accessing a set of images captured by an optical sensor arranged on the end effector while traversing the workpiece; and compiling the set of images into a virtual model representing unloaded surfaces of the workpiece. Generally, in Blocks S112, S110, and S120, the system can implement methods and techniques described in U.S. patent application Ser. No. 18/111, 470 to: autonomously navigate an optical sensor (e.g., a depth sensor and/or a color camera) over the workpiece; capture optical images (e.g., depth maps, photographic color images) of the workpiece; and assemble these optical images into a virtual three-dimensional model that represents surfaces of the workpiece within a wide dimensional tolerance (e.g., +/−0.15"), as shown in FIGS. 1, 3, and 5.

For example, after the operator loads the workpiece into the work zone and confirms processing limits for the workpiece, the system can initiate a scan cycle. During the scan cycle, the system can: navigate the optical sensor—located on the end effector—along the scan path over and offset above the workpiece; monitor a distance between the end effector and the workpiece based on depth data collected by the optical sensor; and implement closed-loop controls to maintain a target offset distance between the optical sensor and the workpiece (e.g., 20", 50 centimeters). In this example, for a workpiece defining an elongated geometry including a long axis located approximately parallel to a longitudinal axis of the work zone, the system can actuate a conveyor supporting the robotic arm to traverse the robotic arm along the longitudinal axis of the work zone while rastering the end effector and the optical sensor laterally across the work zone to capture a sequence of optical images representing all surfaces of the workpiece accessible by a sanding head on the end effector.

The system can thus capture scan data—such as color photographic images, stereoscopic images, depth maps, and/or LIDAR images—from a set of optical sensors arranged on the end effector while traversing the end effector across (e.g., over and not in contact with) the workpiece. For example, the system can capture depth maps at a rate of 2 Hz while traversing the end effector across the workpiece at a rate of three feet per second at a target offset distance of three feet between the end effector and the workpiece, which corresponds to a nominal sensor field of view of three feet by three feet and thus yields approximately 50% overlap between consecutive depth maps captured by the system during the scan cycle.

The system then compiles these optical images into a virtual three-dimensional model of the workpiece as described in U.S. patent application Ser. No. 18/111,470, such as by implementing structure-from-motion techniques or by fusing these optical images into the virtual model based on poses of the robotic arm when these optical images were captured. For example, the system can compile this set of optical images into a three-dimensional mesh within a virtual three-dimensional space.

However, the system can implement any other methods or techniques to navigate the end effector and optical sensor over the workpiece, to collect optical images of the workpiece, and to generate a virtual three-dimensional model of the workpiece based on these optical images.

6. Target Force Parameters

Block S142 of the method S100 recites: assigning a first target force to the first workpiece region. Generally, in Block S142, the system assigns target forces to workpiece regions of the workpiece, such as: based on autonomously-detected, manually-indicated, or derived (e.g., interpolated) maximum compliance (or minimum stiffness) characteristics of these regions; based on geometries (e.g., concave and convex contours, profiles) in these regions of the workpiece; and/or based on a material or part type of the workpiece.

In one implementation, the system retrieves a single target force from the predefined processing profile described above and assigns this target force to the entire workpiece, as shown in FIG. 1.

In another implementation, the system defines boundaries between contiguous regions of the workpiece exhibiting similar contours, such as between contiguous concave, convex, and approximately flat regions of the workpiece spanning more than a minimum surface area (e.g., four square feet). The system then assigns target forces to each region, such as: highest forces in concave regions that may be least susceptible to plastic deformation due to high force application by the sanding head; moderate forces in flat regions that may more susceptible to plastic deformation due to force application by the sanding head; lowest forces in convex regions that may be most susceptible to plastic deformation due to high force application by the sanding head; and/or force magnitudes within a region proportional to the smallest radius within the region. The system can also annotate these regions and corresponding target forces in the virtual model of the workpiece.

Additionally or alternatively, the system can: access or retrieve a compliance characteristic of a compliant backing arranged on the sanding head and supporting a sanding pad; and calculate (or adjust) a target force for a region of the workpiece proportional to this compliance characteristic. Thus, because a sanding head configured with a more compliant (i.e., less stiff) backing may distribute an applied force over a wider area of the workpiece in contact with the sanding pad, the system can assign a higher target force to each region of the workpiece.

6.1 Workpiece Segmentation

In one variation shown in FIGS. 3 and 5, the system segments the workpiece into workpiece regions, such as based on: geometries of the workpiece represented in the virtual model; compliance of the workpiece derived autonomously by the system as described below; and/or compliance annotations supplied by the operator, as described below. The system can then define a toolpath and assign a target force within each workpiece region.

For example, the system can: define a first workpiece region containing a contiguous convex surface; define a second workpiece region containing a contiguous concave surface; and define a third workpiece region containing a contiguous surface approximating a planar geometry (e.g., defining a large effective radius); etc. In another example, the system can: define a first contiguous workpiece region characterized by high detected, predicted, or annotated stiffness; define a second contiguous workpiece region characterized by moderate detected, predicted, or annotated stiffness; and define a third contiguous workpiece region characterized by low detected, predicted, or annotated stiffness; etc.

However, the system can segment the workpiece in any other way and according to any other workpiece characteristics.

7. Tool Path Generation

The system can further implement methods and techniques described in U.S. patent application Ser. No. 18/111,470 to define a toolpath within each region of the workpiece.

In one implementation shown in FIG. 1, the system sets a first feed rate for the first region proportional to the target force assigned to the first region. The system also sets a first stepover distance between segments of a first toolpath for a first region of the workpiece: based on (e.g., proportional to) the target force assigned to this region of the workpiece; and/or proportional to a minimum radius within the first region of the workpiece. The system then: defines a serpentine or boustrophedonic toolpath within the first region of the workpiece according to the nominal stepover distance; and stores this first toolpath as a first set of keypoints, wherein each keypoint represents a vertex or other point on the toolpath, defines a three-dimensional position on the workpiece, includes a vector normal to the workpiece at this three-dimensional position, and is labeled with the target force and the feed rate set for the first region. More specifically, the system can project the first toolpath onto the first region of the workpiece represented in the virtual model, which represents the workpiece in unloaded form. The system can then extract a three-dimensional position and normal vector of each vertex or other point on the first toolpath from the virtual model. Accordingly, the system can store the first toolpath as a first ordered sequence of keypoints: located on a first unloaded surface of the workpiece stored in (i.e., represented by) the virtual model; and contained within the first workpiece region.

In one variation, the system can iteratively adjust this first toolpath based on local radii of the workpiece along segments of the first toolpath. Additionally or alternatively, the system can adjust target forces assigned to segments of the first toolpath: proportional to local radii of convex subregions of the workpiece adjacent these toolpath segments; and inversely proportional to radii of concave subregions of the workpiece adjacent these toolpath segments. Accordingly, the system can set a force greater than the nominal target force within a concave subregion of the workpiece and a target force less than the nominal target force within a convex subregion of the workpiece.

The system can repeat this process for each other region of the workpiece.

Alternatively, the system can implement the foregoing methods and techniques to generate a single continuous toolpath spanning the entire workpiece (or an entire surface of the workpiece selected for autonomous processing by the system).

8. Processing Cycle

Block S150 of the method S100 recites accessing a first sequence of force values output by a force sensor coupled to a sanding head arranged on the end effector. Blocks S152 and S154 of the method S100 recite, via a set of actuators coupled to the end effector: navigating the sanding head across the first workpiece region according to the first toolpath; and, based on the first sequence of force values, deviating the sanding head from the first toolpath to maintain forces of the sanding head on the first workpiece region proximal the first target force.

Generally, Blocks S150, S152, and S154 of the system can implement methods and techniques described in U.S. patent application Ser. No. 18/111,470 to autonomously navigate the sanding head along a toolpath (e.g., a sequence of keypoints) defined within a region of the workpiece and to maintain a target normal force between the sanding head and the workpiece by selectively moving the sanding head into and away from the workpiece normal to the surface of the workpiece represented in the virtual model.

The system also implements closed-loop controls to maintain a target force between the sanding head and the workpiece within each workpiece region—based on force values read from the force sensor integrated into the sanding head—by driving the sanding head toward and away from the workpiece along vectors normal to the workpiece, such as represented in keypoints of these toolpaths or extracted from the virtual model during the processing cycle. For example, for a first keypoint in the first ordered sequence of keypoints, the system can drive the set of actuators to: locate the sanding head at a first three-dimensional position intersecting the first keypoint; align an axis of the sanding head to a first vector contained in the first keypoint; and drive the sanding head, coaxial with the first vector, toward the workpiece to match force values, in a sequence of force values read from the force sensor in the sanding head, to a first target force assigned to a first toolpath containing the first keypoint. The system can then drive the set of actuators to interpolate a three-dimensional path and sanding head orientation from the first keypoint to the second keypoint while implementing closed-loop controls to apply the sanding head to the workpiece with the first target force. The system can repeat this process for each other keypoint defined along the first toolpath and then along subsequent toolpaths defined for other regions of the workpiece.

In a similar implementation, in Block S140, the system defines a first ordered sequence of keypoints located on the virtual model. For each keypoint in the first ordered sequence of keypoints, the system: calculates a vector normal to the virtual model at a location of the keypoint on the virtual model; and stores the vector in the keypoint. The system then stores the first ordered sequence of keypoints as the first toolpath. Then, for a first keypoint in the first ordered sequence of keypoints, the system: locates the sanding head at a first position intersecting the first keypoint in Block S152; aligns an axis of the sanding head to a first vector contained in the first keypoint; and drives the sanding head, coaxial with the first vector, toward the workpiece to match force values, in the first sequence of force values read from the force sensor, to the first target force in Block S154.

8.1 Contact Position Derivation

Block S160 of the method S100 recites tracking a first sequence of positions of a reference point on the sanding head traversing the first workpiece region. Generally, in Block S160, the system tracks three-dimensional positions of a reference point on the sanding head in contact with the workpiece in real space (hereinafter a "contact point").

In one implementation, the system derives a three-dimensional position of the end effector—while occupying a keypoint in the toolpath—based on: positions of each joint or actuator in the robotic arm; the position of the conveyor supporting the robotic arm; and a fixed or derived offset between the end effector and a reference point on a sanding pad supported on the sanding head.

Figure 4:
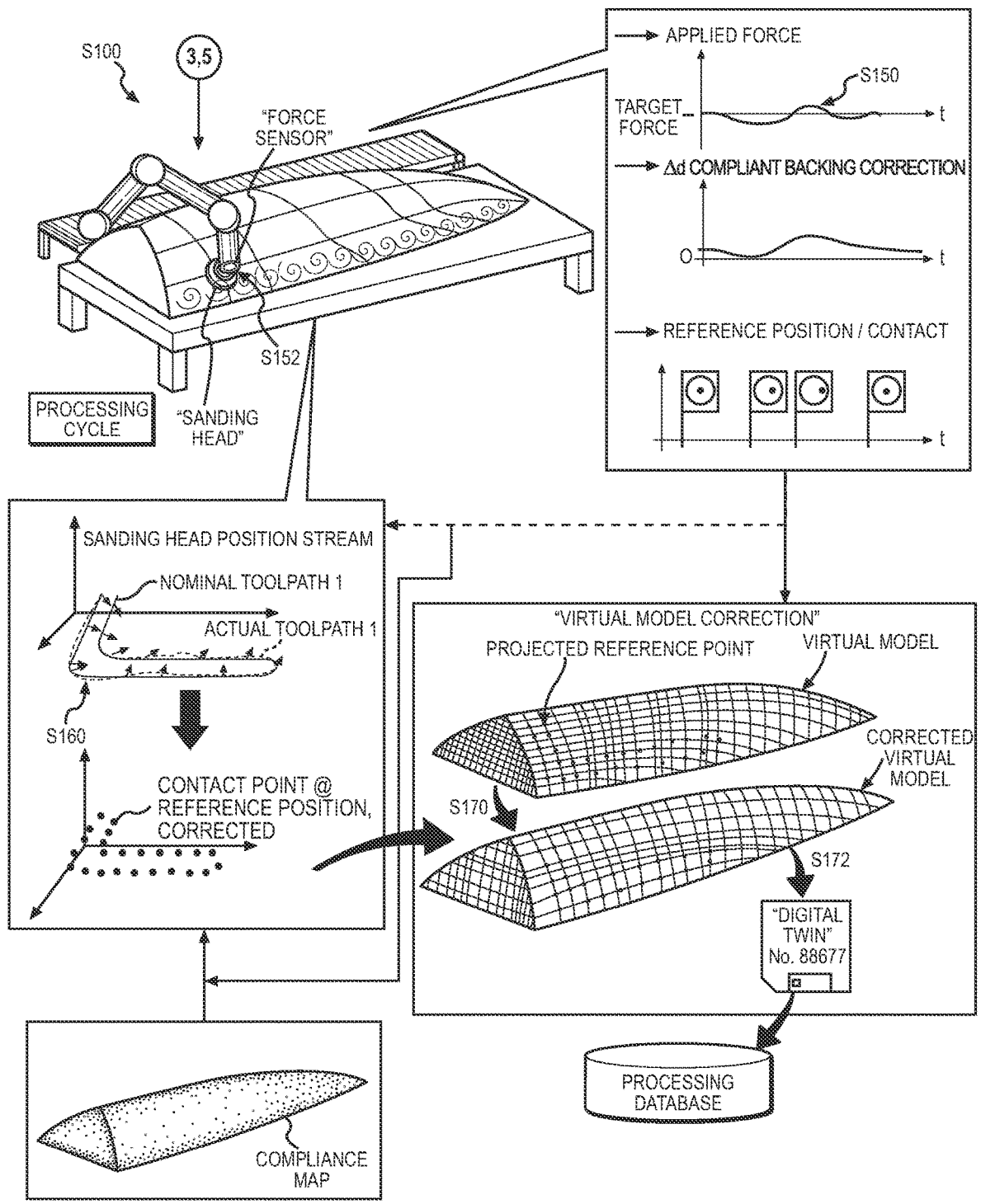
FIG. 4 is a flowchart representation of one variation of the method.

In one implementation shown in FIGS. 2 and 4, the system generates the toolpath containing a sequence of keypoints, each keypoint defining a vector normal to the surface represented in the virtual model at the location of the keypoint. During the processing cycle, the system traverses the sanding head along the toolpath by: interpolating normal vectors between keypoints; and maintaining the axis of the sanding head (e.g., the rotational axis of the sanding head) coaxial with normal vectors defined at and interpolated between keypoints along the toolpath. Accordingly, the system can maintain a point (or a relatively small area) on the sanding pad—proximal the axis of the sanding head—in contact with the workpiece, such as: for all convex surfaces; for all planar surfaces; and for all concave surfaces characterized by radii greater than a minimum radius controlled by compliance of a compliant backing supporting the sanding pad on the sanding head. Therefore, in this implementation, the system can record a sequence of coordinate measurements on the workpiece based on a reference point on the sanding head coincident the rotational axis of the sanding head.

In one variation, during the processing cycle, the system: defines a target axis parallel and offset from the axis of the sanding head by a target offset distance; and implements methods and techniques described above to maintain the target axis coaxial normal vectors defined at and interpolated between keypoints along the toolpath. Accordingly, the system can maintain a reference point on the sanding pad—offset from the axis of the sanding head—in contact with the workpiece. Therefore, in this implementation, the system can record a sequence of coordinate measurements on the workpiece based on a reference point on the sanding head offset from the rotational axis of the sanding head based on the target offset distance. In this variation, the system can also set a fixed target offset distance, such as 50% of the radius of the sanding pad.

Alternatively, in this variation, the system can set this target offset distance for a region of the workpiece based on a geometry of the workpiece, such as inversely proportional to an effective radius of the workpiece region such that this target offset: is approximately null for planar workpiece regions; 90% of the radius of the sanding pad for convex workpiece regions characterize by small radii; and 100% of the radius of the sanding pad for concave workpiece regions characterized by radii less than the radius of the sanding pad. Additionally or alternatively, in this variation, the system can dynamically adjust this target offset distance, such as maintaining consistent wear across the sanding pad during the processing cycle.

Accordingly, the system can: define a target axis parallel to the rotational axis of the sanding head; maintain the target axis normal to workpiece—as represented in the virtual model—while traversing the sanding head across the workpiece; and track and record real three-dimensional positions (or "coordinate measurements") of a reference point on the sanding pad coincident this target axis. For example, the system can record and store three-dimensional positions of the reference point at a pitch distance of 0.10" along the toolpath.

8.1.1 Contact Point by Workpiece Surface Profile

In one example of the foregoing variation, the system: isolates a first workpiece region defining a convex surface profile in the virtual model; generates a first toolpath defining a first continuous path across this first workpiece region of the workpiece in Block S140; sets a first target offset distance of null (i.e., 0.0") for the first workpiece region; and defines a first reference point located on a sanding pad mounted to the sanding head and coaxial with an axis of rotation of the sanding head based on the first target offset distance. While traversing the sanding head across first workpiece region, the system thus records a first sequence of positions of the first reference point in contact with the workpiece while traversing the sanding head along the first toolpath to sand the workpiece.

In this example, the system also: isolates a second workpiece region defining a concave surface profile in the virtual model; generates a second toolpath defining a second continuous path across this second workpiece region of the workpiece in Block S140; sets a second target offset distance (e.g., 50% of the radius of the sanding pad)—greater than the first target offset distance—for the second workpiece region; and defines a second reference point located on the sanding pad and offset from the axis of rotation of the sanding head according to the second target offset distance. While traversing the sanding head across second workpiece region, the system thus records a second sequence of positions of the second reference point while traversing the sanding head along the second toolpath to sand the workpiece.

As described below, the system then deforms the virtual model into alignment with both the first sequence of positions of the first reference point and the second sequence of positions of the second reference point.

9. Virtual Model Correction

Block S170 of the method S100 recites deforming the virtual model into alignment with the first sequence of positions of the reference point. Generally, in Block S170, the system can adjust (or "transform") the virtual model to reflect coordinate measurements captured by the system while traversing the sanding head across the workpiece, thereby fusing the low-resolution, lower-accuracy virtual model with sparse intra-processing contact data to form a higher-resolution, higher-accuracy representation of the workpiece, as shown in FIG. 2

In particular, the system can: navigate an optical sensor—arranged on the end effector on the robotic arm—along the scan path over and offset above the workpiece during a scan cycle in Block S112; access a set of depth maps captured by the optical sensor during the scan cycle in Block S110; compile the set of depth maps into a virtual model characterized by an initial dimensional tolerance relative to a physical geometry of the workpiece in Block S120; and generate a toolpath for the workpiece based on surface contours of the workpiece represented in the virtual model in Block S130. During a subsequent scan cycle, the system: records a sequence of positions of a reference point—on the sanding head—in contact with the workpiece and representing true three-dimensional points on the first workpiece region in Block S160; and then transform the virtual model according to this sequence of positions to narrow (i.e., reduce) the initial dimensional tolerance of the virtual model and thus improve dimensional accuracy of the virtual model.

In one implementation described above, the system compiles images of the workpiece into a three-dimensional mesh within a virtual three-dimensional space in Block S120. Accordingly, in Block S170, the system: projects a set of positions—of the reference point on the sanding head recorded during the processing cycle—into the virtual three-dimensional space; selects a set of vertices in the three-dimensional mesh that correspond to this set of positions of the reference point; and snaps (i.e., moves) this set of vertices in the three-dimensional mesh onto the set of positions of the reference point within the virtual three-dimensional space.

For example, for each contact point—in the sequence of contact points between the sanding head and the workpiece—recorded by the system during the processing cycle, the system can: project a coordinate of the contact point from real space into the virtual three-dimensional space; select a target vertex in the mesh nearest this coordinate; shift the target vertex—normal to the mesh at the vertex—to a new position minimally offset from the coordinate; and shift nearby vertices in the mesh to minimize changes in tangents on the local surface of the mesh and/or to reduce changes in local radii around the target vertex.

In another implementation, the system compiles images of the workpiece into a three-dimensional surface within a virtual three-dimensional space in Block S120. Then, for each contact point in the sequence of contact points between the sanding head and the workpiece thus captured by the system, the system: isolates a location on the toolpath—defined along the surface of the virtual model in Block S130—corresponding to this contact point; inserts a vertex on the surface of the virtual model at this toolpath location; projects a coordinate of the contact point from real space into the virtual three-dimensional space; and deforms the surface of the virtual model to locate the vertex on the coordinate while minimizing changes in contours on the surface near the vertex.

Therefore, the system can fuse the virtual model, characterized by lower dimensional accuracy, with coordinate measurements captured by the system while processing (i.e., sanding) the workpiece to generate a more dimensionally accurate representation of the workpiece.

However, the system can implement any other method or technique to modify the virtual model according to coordinate measurements captured in real-time by the system while processing the workpiece.

9. Digital Twin Record+Database

In one variation shown in FIG. 2, the system: stores the corrected virtual model as a "digital twin" of the workpiece; associates the corrected virtual model with the workpiece; annotates the corrected virtual model with processing data from the processing cycle; and/or stores the corrected virtual model in a database for later access, such as to verify dimensions, dimensional accuracy, and/or processing history of the workpiece.

In one implementation shown in FIG. 2, the system searches scan data—captured by the system during the scan cycle in Block S112—for an optical identifier (e.g., a barcode, a quick-response code, a serial number) uniquely identifying the workpiece. Upon detecting an optical identifier in these scan data, such as on the workpiece or on a tag adjacent the workpiece, the system can extract a unique identifier from this optical identifier. The system then: initializes a digital file linked to the unique identifier; writes the corrected virtual model (e.g., a digital three-dimensional record, a digital twin of the workpiece) to the digital file; and uploads the digital file to a workpiece database. The system can therefore: store a digital three-dimensional record—defining a digital twin of the workpiece—in the workpiece database; and link this digital three-dimensional record to the unique identifier detected on or adjacent the workpiece.

Additionally or alternatively, the system can: project the toolpath generated in Block S130 onto the corrected virtual model; project the sequence of contact points captured in Block S160 during the processing cycle onto the corrected virtual model; project the sequence of force values captured in Block S150 during the processing cycle on the corrected virtual model with forces; and/or project actual sanding head feed rates and speed rates implemented by the system onto corresponding regions of the corrected virtual model. However, the system can annotate the corrected virtual model with any other data collected by the system during the processing cycle in order to generate a more comprehensive processing record for the workpiece.

10. Contact Position Correction

In one variation shown in FIG. 4, the system corrects recorded contact positions of a reference point recorded in Block S160 based on forces with which the system applied the sanding head to the workpiece during the processing cycle, such as to correct these contact positions for: compression of a compliant backing supporting the sanding pad on the sanding head; or elastic deformation of the workpiece. The system then corrects (e.g., transforms) the virtual model according to these corrected contact positions.

10.1 Compliant Backing

In one implementation shown in FIG. 4, the system: accesses a compliance characteristic of a compliant backing supporting a sanding pad on the sanding head. Then, for a first contact position in the first sequence of contact positions recorded in Block S160, the system: records a first force applied by the sanding head on the workpiece when the reference point contacts the workpiece at the first contact position; calculates a correction offset based on (e.g., proportional to) the compliance characteristic of the compliant backing and the first force; and shifts the first contact position by the correction offset in a direction normal to a surface defined in the virtual model at the first position. The system then repeats this process for each other contact point recorded during the processing cycle in Block S160 to correct the three-dimensional positions of these contact points for compression of the compliant backing against the workpiece.

10.2 Force Correction by Workpiece Compliance

In another implementation, the system: predicts local deformation of the workpiece based on compliance characteristics of the workpiece and forces applied by the sanding head during the processing cycle; and adjusts contact points recorded in Block S160 according to these local deformation predictions.

10.2.1 Empirical Local Compliance Map Derivation

In one variation shown in FIG. 3, during a scan cycle, the system: navigates the end effector over a first section of a workpiece in Block S112; accesses a first set of images captured by an optical sensor arranged on the end effector while traversing the first section of the workpiece in Block S110; compiles the first set of images into a virtual model defining unloaded surfaces of the workpiece in Block S120; calculates a first vector normal to a first location in the first section of the workpiece based on the virtual model; accesses a first sequence of force values from a force sensor arranged on the end effector while driving the end effector along the first vector toward the first location on the workpiece; and characterizes a first compliance of the workpiece at the first location based on the first sequence of force values and a first sequence of positions of the end effector following contact between the end effector and the workpiece. In this variation, the system further: navigates the end effector over a second section of the workpiece in Block S112; accesses a second set of images captured by the optical sensor while traversing the second section of the workpiece in Block S110; expands the virtual model based on the second set of images in Block S120; calculates a second vector normal to a second location in the second section of the workpiece; accesses a second sequence of force values from the force sensor while driving the end effector along the second vector toward the second location on the workpiece; and characterizes a second compliance of the workpiece at the second location based on the second sequence of force values and a second sequence of positions of the end effector following contact between the end effector and the workpiece.

Generally, in this variation, the system can: autonomously navigate the end effector over a first region of the workpiece; capture a first sequence of optical images of the first region of the workpiece; compile these images into a first segment of the virtual model representing the workpiece; define a set of (i.e., one or more) test locations in the first region of the workpiece; define an approach vector at each test location based on a geometry of the virtual model at corresponding locations; autonomously navigate the sanding head along these approach vectors and into contact with the workpiece at these locations; track forces applied by the sanding head to the workpiece and displacement of the workpiece from an unloaded geometry at these locations; derive compliance (e.g., inverse of spring rate, stiffness) characteristics of the workpiece at these locations in the first region of the workpiece based on these force and displacement data; and repeat this process for each subsequent region of the workpiece traversed by the end effector during the scan cycle. The system can therefore collect sparse empirical compliance data of the workpiece in real-time while scanning the workpiece during the scan cycle.

In one implementation, the system can construct a partial virtual model of the workpiece and define a set of test locations (or "stiffness probe locations") on the workpiece based on local characteristics of the workpiece—defined in the virtual model—near the present location of the end effector in real-time during a scan cycle. Upon defining a test location, the system can: pause the scan cycle; calculate a vector normal to the virtual model at the test location; and navigate the end effector and thus the sanding head (or a discrete force-displacement probe arranged on the end effector) along the vector toward the test location. Once the force on the end effector outputs a signal indicating application of a force greater than a minimum threshold force, the system can: detect contact between the sanding head (or the force-displacement probe) on the workpiece; record a nominal (or unloaded) position of the workpiece at this test location based on a pose of the end effector at this initial time of contact; and record a series of force data and displacement data (i.e., a one-dimensional change in position of the end effector from the nominal position parallel to the vector) while driving the sanding head along the vector. The system then: withdraws the end effector from this test location on the workpiece once the end effector approaches the earlier of—but does not reach or exceed—a maximum displacement (e.g., 0.50") set for the workpiece from the nominal position or application of the maximum force (e.g., 5 lbs.) set for the workpiece; derives a spring rate (i.e., a representation of compliance) of the workpiece at this location based on the maximum force and concurrent displacement of the workpiece; annotates a corresponding point on the virtual model with this spring rate; and then resumes the scan cycle to scan a next region of the workpiece. The system: repeats this process for each other region and test location calculated for the workpiece; and interpolates between these spring rate and location pairs to generate a compliance (or stiffness) gradient representing compliance across the entire accessible area of the workpiece.

For example, the system can execute this process to collect sparse empirical compliance data for a workpiece characterized by a large and/or high-aspect-ratio (i.e., a long, narrow) workpiece in order to avoid multiple traversals over the workpiece. Conversely, the system can: first scan the workpiece to collect optical images of the workpiece; compile these optical images into a virtual three-dimensional model of the workpiece; and then implement similar methods and techniques to define and execute test locations across the workpiece based on a geometry of the workpiece represented in this virtual model, such as for a small or short workpiece.

10.2.2 Test Location Selection

In one implementation, the system projects a grid defining test locations onto the workpiece, such as on fixed lateral and longitudinal pitch distances proportional to the width and length of the workpiece, respectively.

In another implementation shown in FIG. 3, the system defines a pitch distance between adjacent test locations inversely proportional to a radius of curvature of the workpiece between these test locations. For example, the system can: implement methods and techniques described above to construct a first segment of the virtual model based on optical images collected while traversing the end effector across a first region of the workpiece; derive a minimum or effective radius of this first region of the workpiece from the corresponding segment of the virtual model; and set a shorter pitch distance between test locations within the first region of the workpiece if this minimum or effective radius is large, and vice versa. More specifically, a large effective radius within the first region of the workpiece corresponds to a flatter surface that may exhibit less inherent stiffness and therefore may be more susceptible to damage from application of excess force than a tightly curved surface characterized by a small effective radius. Therefore, the system can set a shorter pitch distance between test locations—and therefore a higher frequency of test locations—within the first region of the workpiece if this region exhibits a large effective radius, and vice versa.

Therefore, in this implementation, the system can: characterize a first effective radius of the first region of the workpiece based on a first surface profile of the first region of the workpiece represented in a first section of the virtual model; assign a first test location density to the first region of the workpiece based on (e.g., proportional to) the first effective radius; define a first quantity of test locations in the first region of the workpiece according to the first test location density; and then drive the end effector against these test locations to collect sparse empirical compliance data for this first region of the workpiece. The system can then: characterize a second effective radius of the second region of the workpiece—less than the first radius—based on a second surface profile of the second region of the workpiece represented in a second section of the virtual model; assign a second test location density—less than the first density—to the second region of the workpiece based on (e.g., proportional to) the second effective radius; define a second quantity of test locations in the second region of the workpiece according to the second test location density; and then drive the end effector against these test locations to collect sparse empirical compliance data for this second region of the workpiece.

In a similar example, the system can set a short pitch distance between test locations (or a high frequency of test locations) near edges of the workpiece, such as specifically along unconstrained edges of the workpiece or edges of the workpiece not directly supported by the support rig below.

In a similar implementation, because concave surfaces on the workpiece may be less susceptible to inward deformation (or "oil-canning") than convex surfaces on the workpiece due to application of the sanding head on the workpiece, the system can: set a wider pitch distance between test locations (or a lower frequency of test locations) in concave regions of the workpiece; and set a short pitch distance between test locations (or a higher frequency of test locations) in convex regions of the workpiece. The system can thus derive characteristics (e.g., convex or concave geometry; minimum or effective radius) based on workpiece features stored in the virtual model.

Then, after defining a test location in the virtual model, the system can: calculate a test axis (e.g., a vector in system coordinates) normal to the test location in the virtual model; extract a three-dimensional position of this test location in system coordinates; navigate the end effector above this three-dimensional position of this test location in system coordinates; orient the end effector to align a test axis of the end effector (e.g., a test axis of the sanding head on the end effector) to the test axis in system coordinates; and then articulate the robotic arm along (or otherwise parallel to) the test axis to move the end effector toward the three-dimensional position of this test location in the system. Concurrently, the system can access an initial sequence of force values from the force sensor in the end effector while driving the end effector along this test axis vector toward the first test location on the workpiece. Then, in response to a force value—in this initial sequence of force values—exceeding a low threshold contact force, the system can: detect initial contact between the sanding head; record a true unloaded three-dimensional position of the test location in system coordinates at the time of this initial contact; and then record a sequence of force values from the force sensor while continuing to drive the end effector along the test axis and below the test location. The system can also calculate a maximum offset position—inset from the true unloaded three-dimensional position of the test location along the test axis—by a distance less than the maximum deflection distance set for the workpiece. Then, in response to the end effector (e.g., the sanding head) approaching the first maximum offset position below the true unloaded three-dimensional position of the test location, the system can: withdraw the end effector (e.g., the sanding head) from the workpiece; calculate a spring rate of the workpiece at the test location based on the maximum force in the sequence of force values and the corresponding position of the end effector below the true unloaded three-dimensional position of the test location during this compliance test cycle; and then move to a next test location defined on the workpiece or resume the scan cycle.

10.2.3 Operator-Entered Compliance Annotations

In a similar variation shown in FIG. 5, the system: prompts an operator to annotate the virtual model with compliance characteristics of the workpiece. More specifically, in this implementation, the system can interface with the operator to record stiffness (or compliance) annotations for points, edges, or areas (hereinafter "regions") of the workpiece.

In particular, in this variation, the system can: collect scan data representing the workpiece while traversing the end effector and optical sensor across the workpiece; compile these scan data into a virtual three-dimensional model of the workpiece; render the virtual model in a user interface (e.g., on a display adjacent the system) accessible to the operator; and prompt the operator to annotate the virtual model with compliance tags, such as by writing high-, moderate-, and low-compliance tags (or low-, moderate-, and high-stiffness tags, respectively) to representative point locations, edges, and/or areas on the virtual model based on compliance of corresponding regions of the workpiece.

In one implementation, the system prompts the operator to manually annotate the virtual model with compliance estimates (e.g., the operator's perception of workpiece compliance), such as including: "fixed" (or "very stiff," "retained") regions, such as workpiece edges clamped to a table, fixture, or other support rig; "stiff" regions, such as thick-walled regions or regions as backed by large or rigid interior structures, gussets, or webs; and/or "compliant" regions, such as unsupported edges or large, flat, thin-walled regions of the workpiece. For example, the system can prompt the operator to "click on" points on the virtual model to place virtual pins and to select a retained, stiff, or compliant label for each of these virtual pins from a drop-down menu. Additionally or alternatively, for each virtual pin dropped on the virtual model by the operator, the computer system can: render a slider—defining a range of compliance options—linked to the virtual pin; and prompt the user to adjust the slider to an estimated compliance of the corresponding region of the workpiece.

In another implementation, the system: implements methods and techniques described above to define test locations in regions of the virtual model, such as based on surface geometries of the workpiece represented in these regions of the virtual model; prompts the operator to enter compliance annotations at these particular test locations; and records compliance values thus entered by the operator at these test locations. In a similar implementation, the system can: implement methods and techniques described above to define a minimum density of test locations and a maximum or target pitch distance between test locations based on geometry characteristics of the workpiece represented in the virtual model; and prompt the operator to supply compliance annotations according to these density or pitch targets. In one example, the system: isolates a first concave section of the virtual model; and isolates a second convex section of the virtual model. The system then prompts the operator to locate a first density of points—annotated with compliance magnitudes—on the first concave section of the virtual model; and similarly prompts the operator to locate a second density of points—greater than the first density and annotated with compliance magnitudes—on the second concave section of the virtual model.

However, the system can implement any other methods or techniques to passively receive compliance annotations from the operator and/or actively query the operator for compliance annotations and particular locations on the workpiece.

10.2.4 Compliance Map Construction

As shown in FIGS. 3 and 5, the system then: aggregates compliance values autonomously derived by the system and/or stored in compliance tags entered manually by the operator; interpolates between these compliance values to calculate a compliance gradient across the workpiece; and stores this compliance gradient in a three-dimensional compliance map of the workpiece. For example, the system can generate a compliance map that represents spring constants (i.e., deformation distance per unit force applied) across the workpiece.

For example, the system can: extract a set of three-dimensional points—distributed across the virtual model and annotated with compliance magnitudes—from compliance annotations supplied by the operator; and interpolate between compliance magnitudes and locations of this set of points to generate a compliance gradient across the virtual model of the workpiece.

However, the system can implement any other method or technique to compile compliance data for the workpiece into a compliance map or other representation of varying compliance (or "stiffness") characteristics of the workpiece.

10.2.5 Target Processing Parameters

In the foregoing variation, the system can also assign a target (or maximum) force within regions of the workpiece, such as: proportional to a minimum stiffness of the workpiece within this region; or inversely proportional to the maximum compliance of the workpiece within this region. In particular, application of the sanding head to the workpiece with a greater force may yield a higher material removal rate, thereby enabling the system to achieve target material removal from the workpiece at a higher feed rate (i.e., faster sanding head traversal rate across the workpiece) and/or at a larger stepover distance between adjacent segments of a toolpath traversed by the sanding head. However, application of the sanding head to the workpiece with a greater force may damage (e.g., plastically deform) the workpiece.

Therefore, the system can: calculate a target force for a region of the workpiece based on (e.g., inversely proportional to) a maximum compliance within the region; and set a nominal feed rate and/or a nominal stepover distance for this region of the workpiece proportional to this target force. The system can repeat this process for each region of the workpiece. For example, the system can: retrieve a nominal force for processing a rigid workpiece; and calculate a target force for a particular region of the workpiece proportional to a combination (e.g., product) of this nominal force and a stiffness coefficient of the region of the workpiece, such as a stiffness coefficient of 100% for a rigid and constrained region of the workpiece, and stiffness coefficients less than 100% for more compliant (i.e., less stiff) regions of the workpiece, as indicated in the compliance map.

The system can thus: segment the workpiece into contiguous regions characterized by similar compliance characteristics, as represented in the compliance map; define a toolpath within each region of the workpiece based on surface contours represented in corresponding regions of the virtual model; and assign target forces to these toolpaths (or to segments of the toolpaths) based on local compliance characteristics represented in the compliance map.

10.2.6 Deformation Prediction and Correction

The system can then: predict local deformations (e.g., depths of inward deflection) of the workpiece due to application of the sanding head based on compliance characteristics of the workpiece represented in the compliance map and the sequence of force values captured in Block S150; and correct three-dimensional positions of contact points recorded during the processing cycle in the Block S160 according to these predicted local deformations, as shown in FIG. 4.

In one implementation, the system: selects a first position in the sequence of positions of the reference point recorded in Block S160; retrieves an area of the sanding pad; retrieves a force applied by the sanding head onto the workpiece while occupying the first position; estimates a deflection distance of the workpiece around the sanding head based on this force, the area of the sanding pad, and compliance of the workpiece representing in the compliance map around this first position; and shifts the first position —along a vector normal to the surface defined in the virtual model and extending through the first position—by the deflection distance. The system then repeats this process for each other position in the sequence of positions of the reference point recorded in Block S160.

In this implementation, the system can then transform the virtual model according to these corrected contact points in Block S170, as described above.

10.3 Sparse Coordinate Measurement Correction

In a similar variation shown in FIG. 3, the system can: directly probe sparse locations on the workpiece prior to the processing cycle (e.g., during the scan cycle) to record ground truth three-dimensional positions of these locations on the workpiece; correct contact points recorded in Block S160 based on these ground truth three-dimensional positions; and then deform the virtual model according to these corrected contact points in Block S170, as described above.

In one implementation, during the scan cycle, the system: defines a first probe location in a first workpiece region of the workpiece, such as based on a contour (e.g., convex or concave surface) represented in the virtual model; calculates a first vector normal to the first probe location in the first workpiece region based on the virtual model; accesses a sequence of force values from the force sensor while driving the end effector along the first vector toward the first probe location on the workpiece; records a first probe position of a reference point on the sanding head upon contact with the workpiece proximal the first probe location based on an increase in force values (e.g., from a null or tare force value) in this sequence of force values; repeats this process for other probe locations on the workpiece; and stores these probe positions as ground truth three-dimensional positions of a sparse distribution of points on the workpiece.

In this implementation, following the processing cycle, the system: identifies a first contact point—from the first sequence of contact points recorded in Block S160—proximal the first probe position recorded during the scan cycle; calculates a correction offset for the first contact point (and nearby contact points in the sequence of contact points) based on a difference between the first probe position and the first contact point; and shifts the first contact point (and nearby contact points) according to the correction offset. The system repeats this process for other contact points and probe positions recorded by the system during the scan cycle and the processing cycle to correct the sequence of the contact points. The system then deforms the virtual model according to these corrected contact points in Block S170, as described above.

11. Interwoven Scanning+Processing+Model Correction

In another variation, the system implements methods and techniques described above to: scan a first region of the workpiece while capturing a first set of images of the workpiece; generate a virtual model representing the first region of the workpiece based on these images; generate a first toolpath spanning the first region of the workpiece based on a surface represented in the virtual model; assign a first target force to the first toolpath; autonomously navigate the sanding head across the first region of the workpiece while maintaining the first target force against the workpiece and recording a first sequence of three-dimensional of positions of a reference point on the sanding head in contact with the workpiece; and correct the virtual model according to this first sequence of positions.

In this variation, the system repeats this process for each subsequent region of the workpiece, such as including: scanning a second region of the workpiece while capturing a second set of images of the workpiece; expanding (e.g., updating) the virtual model to represent the second region of the workpiece based on these images; generating a second toolpath spanning the second region of the workpiece based on the expanded surface represented in the virtual model; assigning a second target force to the second toolpath;

autonomously navigating the sanding head across the second region of the workpiece while maintaining the second target force against the workpiece and recording a second sequence of three-dimensional of positions of the reference point on the sanding head in contact with the workpiece; and correcting the virtual model according to this second sequence of positions.

For example, the system can execute the foregoing process to interleave scan and processing cycles for an elongate workpiece exhibiting a high length-to-width ratio in order to avoid multiple traversals of the elongate workpiece.

However, the system can selectively execute the scan cycle and pause the scan cycle to interleave segments of the processing cycle to process (e.g., sand) the workpiece according to any other schema.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
 accessing a virtual model representing a geometry of a workpiece;
 accessing a first toolpath defined for a first workpiece region of the workpiece;
 accessing a first target force assigned to the first workpiece region;
 during a processing cycle:
  accessing a first sequence of force values output by a force sensor coupled to a sanding head;
  via a set of actuators:
   navigating the sanding head across the first workpiece region according to the first toolpath; and
   based on the first sequence of force values, deviating the sanding head from the first toolpath to maintain forces of the sanding head on the first workpiece region proximal the first target force; and
  detecting a first sequence of positions of the sanding head in contact with the first workpiece region;
 transforming the virtual model into alignment with the first sequence of positions; and
 storing the virtual model, transformed according to the first sequence of positions, as a digital record of the workpiece.

2. The method of claim 1:
 further comprising:
  navigating an optical sensor over and offset from the workpiece during a scan cycle preceding the processing cycle; and
  accessing a set of images captured by the optical sensor during the global scan cycle;
 wherein accessing the virtual model of the workpiece comprises generating the virtual model of the workpiece based on the set of images; and
 wherein accessing the first toolpath comprises generating the first toolpath based on a first geometry of first the workpiece region represented in the virtual model.

3. The method of claim 2:
 further comprising, during the scan cycle preceding the processing cycle, navigating the optical sensor along a scan path over and offset from the workpiece;
 wherein accessing the set of images comprises accessing the set of images comprising depth maps captured by the optical sensor while traversing the scan path during the scan cycle;
 wherein generating the virtual model of the workpiece comprises compiling the set of images into the virtual model representing the geometry of the workpiece with an initial dimensional accuracy;
 wherein detecting the first sequence of positions comprises recording the first sequence of positions of a reference point, on the sanding head, in contact with the first workpiece region during the processing cycle; and
 wherein transforming the virtual model into alignment with the first sequence of positions comprises transforming the virtual model into alignment with the first sequence of positions to increase dimensional accuracy of the geometry of the workpiece represented in the virtual model.

4. The method of claim 2:
 further comprising detecting a unique identifier of the workpiece in the set of images; and
 wherein storing the virtual model, transformed according to the first sequence of positions, as the digital three-dimensional record of the workpiece comprises:
  storing the digital three-dimensional record, defining a digital twin of the workpiece, in a workpiece database;
  linking the digital three-dimensional record to the unique identifier.

5. The method of claim 1:
 wherein accessing the virtual model of the workpiece comprises accessing the virtual model of the workpiece comprising a three-dimensional mesh within a virtual three-dimensional space; and
 wherein transforming the virtual model comprises:
  projecting the first sequence of positions into the virtual three-dimensional space; and
  snapping a first set of vertices in the three-dimensional mesh to the first sequence of positions projected into the virtual three-dimensional space.

6. The method of claim 1:
 further comprising:
  accessing a second toolpath defined for a second workpiece region of the workpiece based on the geometry of the workpiece;
  accessing a second target force assigned to the second workpiece region; and during the processing cycle:
accessing a second sequence of force values output by the force sensor;
via the set of actuators:
navigating the sanding head across the second workpiece region according to the second toolpath; and
based on the second sequence of force values, deviating the sanding head from the second toolpath to maintain forces of the sanding head on the second workpiece region proximal the second target force; and
detecting a second sequence of positions of the sanding head while in contact with the second workpiece region;
wherein transforming the virtual model into alignment with the first sequence of positions comprises transforming a first segment of the virtual model, representing the first workpiece region, into alignment with the first sequence of positions; and
further comprising transforming a second segment of the virtual model, representing the second workpiece region, into alignment with the second sequence of positions.

7. The method of claim 1, further comprising:
defining a first probe location in the first workpiece region;
calculating a first vector normal to the first probe location in the first workpiece region based on the virtual model;
accessing a second sequence of force values from the force sensor while driving the end effector along the first vector toward the first probe location on the workpiece;
based on an increase in force values in the second sequence of force values, recording a first probe position the sanding head responsive to contact of the sanding head with the workpiece proximal the first probe location;
identifying a first position, in the first sequence of positions of the sanding head in contact with the first workpiece region during the processing cycle, proximal the first probe position;
calculating a correction offset for the first sequence of positions based on a difference between the first probe position and the first position; and
shifting the first sequence of positions according to the correction offset.

8. The method of claim 7:
further comprising, calculating a sequence of deviations between the first toolpath and the first sequence of positions; and
wherein defining the first probe location in the first workpiece region comprises defining the first probe location in the first workpiece region in response to a first deviation, in the sequence of deviations and proximal the first probe location, exceeding a threshold deviation.

9. The method of claim 1:
wherein accessing the first toolpath comprises:
defining the first toolpath comprising a first ordered sequence of keypoints located on the virtual model; and
for each keypoint in the first ordered sequence of keypoints:
calculating a vector normal to the virtual model at a location of the keypoint on the virtual model; and
storing the vector in the keypoint; and
wherein navigating the sanding head across the first workpiece region according to the first toolpath and deviating the sanding head from the first toolpath comprises:
for a first keypoint in the first ordered sequence of keypoints, via the set of actuators:
locating the sanding head at a first position intersecting the first keypoint;
aligning an axis of the sanding head to a first vector contained in the first keypoint; and
driving the sanding head, coaxial with the first vector, toward the workpiece to match force values, in the first sequence of force values read from the force sensor, to the first target force.

10. The method of claim 1:
wherein accessing the first toolpath comprises, based on the virtual model:
isolating the first workpiece region defining a convex surface profile; and
generating the first toolpath defining a first continuous path across the first workpiece region of the workpiece; and
wherein tracking the first sequence of positions during the processing cycle comprises tracking the first sequence of positions of a first reference point on the sanding head traversing the sanding head across the first workpiece region, the first reference point located on a sanding pad mounted to the sanding head and coaxial with an axis of rotation of the sanding head.

11. The method of claim 10, further comprising:
based on the virtual model:
isolating a second workpiece region defining a concave surface profile; and
generating a second toolpath defining a second continuous path across the second workpiece region of the workpiece;
extracting a radius of the second workpiece region from the virtual model;
assigning a second target force to the second workpiece region;
during the processing cycle:
via the set of actuators:
navigating the sanding head across the second workpiece region according to the second toolpath; and
based on the first sequence of force values, deviating the sanding head from the second toolpath to maintain forces of the sanding head on the second workpiece region proximal the second target force; and
detecting a second sequence of positions of a second reference point on the sanding head traversing the second workpiece region, the second reference point located on the sanding pad offset from the axis of rotation of the sanding head by a distance inversely proportional to the radius of the second workpiece region; and
transforming the virtual model into alignment with the second sequence of positions.

12. The method of claim 1, further comprising:
accessing a compliance characteristic of a compliant backing supporting a sanding pad on the sanding head; and
for a first position in the first sequence of positions:
accessing a first force value, in the first sequence of force values, applied by the sanding head on the workpiece responsive to contacts between the sanding head and the workpiece at the first position;

calculating a correction offset based on the compliance characteristic of the compliant backing and the first force; and shifting the first position by the correction offset in a direction normal to a surface defined in the virtual model at the first position.

13. The method of claim 1, further comprising:

calculating a first correction offset proportional to the first target force; and shifting the first sequence of positions, normal to corresponding surfaces defined in the virtual model, according to the first correction offset.

14. The method of claim 13, further comprising:

generating a second toolpath for a second workpiece region of the workpiece based on the geometry of the workpiece represented in the virtual model;

assigning a second target force, less than the first target force, to the second workpiece region;

during the processing cycle:
   via the set of actuators coupled to the end effector:
      navigating the sanding head across the second workpiece region according to the second toolpath; and
      based on the first sequence of force values, deviating the sanding head from the second toolpath to maintain forces of the sanding head on the second workpiece region proximal the second target force;
   tracking a second sequence of positions of the reference point traversing the second workpiece region;
   calculating a second correction offset, less than the first correction offset, proportional to the second target force;
   shifting the second sequence of positions, normal to corresponding surfaces defined in the virtual model, according to the second correction offset; and
   transforming the virtual model into alignment with the second sequence of positions of the reference point.

15. The method of claim 13:

further comprising:
   accessing a set of compliance characteristics of regions of the workpiece;
   defining the first workpiece region characterized by a first compliance characteristic, in the set of compliance characteristics, within a first compliance range; and
   defining the second workpiece region characterized by a second compliance characteristic, in the set of compliance characteristics, within a second compliance range greater than the first compliance range;
wherein accessing the first target force comprises assigning the first target force to the first workpiece region based on the first compliance; and
wherein assigning the second target force to the second workpiece region comprises assigning the second target force, less than the first force, to the second workpiece region based on the second compliance range.

16. A method comprising:

accessing a virtual model representing a workpiece;
accessing a toolpath comprising:
   a first keypoint corresponding to a first model vertex located on the virtual model; and
   a second keypoint corresponding to a second model vertex located on the virtual model;
accessing a target force assigned to the workpiece;
during a processing cycle:
   accessing a sequence of force values output by a force sensor coupled to a sanding head;
   via a set of actuators:
      navigating the sanding head across the workpiece according to the toolpath; and
      based on the sequence of force values, deviating the sanding head from the toolpath to maintain forces of the sanding head on the workpiece proximal the target force;
   detecting a first position of a reference surface, on the sanding head, in contact with the workpiece when the sanding head occupies the first keypoint;
   detecting a second position of the reference surface in contact with the workpiece when the sanding head occupies the second keypoint;
modifying the virtual model to align:
   the first model vertex on the virtual model to the first position of the reference surface; and
   the second model vertex on the virtual model to the second position of the reference surface; and
storing the virtual model as a digital three-dimensional record of the workpiece.

17. The method of claim 16:

wherein accessing the virtual model of the workpiece comprises accessing the virtual model comprising a three-dimensional mesh within a virtual three-dimensional space; and
wherein modifying the virtual model comprises:
   projecting the first position of the reference surface and the second position of the reference surface into the virtual three-dimensional space;
   snapping the first model vertex in the three-dimensional mesh to the first position projected into the virtual three-dimensional space; and
   snapping the second model vertex in the three-dimensional mesh to the second position projected into the virtual three-dimensional space.

18. A method comprising:

accessing a virtual model of a workpiece;
accessing a toolpath defined for the workpiece;
accessing a target force assigned to the workpiece;
during a processing cycle:
   accessing a sequence of force values output by a force sensor coupled to a sanding head;
   via a set of actuators:
      navigating the sanding head across the workpiece according to the toolpath; and
      based on the sequence of force values, deviating the sanding head from the toolpath to maintain forces of the sanding head on the workpiece proximal the target force; and
   detecting a sequence of positions of a reference surface on the sanding head in contact with the workpiece; and
generating a digital three-dimensional record of the workpiece by transforming the virtual model into alignment with the sequence of positions of the reference surface.

19. The method of claim 1:

wherein accessing the virtual model of the workpiece comprises accessing the virtual model of the workpiece comprising a three-dimensional surface within a virtual three- dimensional space; and
wherein generating the digital three-dimensional record comprises, for each position in the first sequence of position:
   isolating a nominal toolpath location the first toolpath, defined along the surface of the virtual model, corresponding to this position;

inserting a vertex on the surface of the virtual model at the nominal toolpath location;
projecting a coordinate of the position into the virtual three-dimensional space; and
transforming the surface of the virtual model to locate the vertex on the coordinate.

* * * * *